United States Patent
Yan et al.

(10) Patent No.: US 12,539,433 B2
(45) Date of Patent: Feb. 3, 2026

(54) TARGET OBJECT TRACKING METHOD, TRACKING SYSTEM AND ELECTRONIC DEVICE FOR USE IN RADIOTHERAPY

(71) Applicant: OUR UNITED CORPORATION, Xi'an (CN)

(72) Inventors: Hao Yan, Xi'an (CN); Jinsheng Li, Xi'an (CN)

(73) Assignee: OUR UNITED CORPORATION (CN)

( * ) Notice: Subject to any disclaimer, the term of this patent is extended or adjusted under 35 U.S.C. 154(b) by 437 days.

(21) Appl. No.: 18/157,929

(22) Filed: Jan. 23, 2023

(65) Prior Publication Data

US 2023/0149740 A1 May 18, 2023

Related U.S. Application Data

(63) Continuation of application No. PCT/CN2020/104977, filed on Jul. 27, 2020.

(51) Int. Cl.
 *A61N 5/10* (2006.01)
(52) U.S. Cl.
 CPC ......... *A61N 5/1049* (2013.01); *A61N 5/1045* (2013.01); *A61N 2005/1061* (2013.01)
(58) Field of Classification Search
 USPC ......................................................... 382/103
 See application file for complete search history.

(56) References Cited

U.S. PATENT DOCUMENTS

| | | |
|---|---|---|
| 2008/0089480 A1 | 4/2008 | Gertner |
| 2014/0241505 A1* | 8/2014 | Xu ................... G01N 23/20066 378/87 |
| 2015/0154752 A1* | 6/2015 | Hirai ........................ G06T 7/32 382/132 |
| 2020/0234471 A1 | 7/2020 | Lu et al. |

FOREIGN PATENT DOCUMENTS

| | | | |
|---|---|---|---|
| CN | 103025283 A | 4/2013 | |
| CN | 104665854 A * | 6/2015 | ........... A61B 6/0492 |
| CN | 104667435 A | 6/2015 | |

(Continued)

OTHER PUBLICATIONS

PCT International search report of PCT/CN2020/104977 issued on Apr. 16, 2021.

*Primary Examiner* — Jacky X Zheng
(74) *Attorney, Agent, or Firm* — Emerson, Thomson & Bennett, LLC; Roger D. Emerson; Peter R. Detorre

(57) ABSTRACT

A tracking method, a tracking system, and an electronic device are provided. The tracking method includes: acquiring an actual scattering image of a target object at time i, where i is an integer greater than 0, and the actual scattering image is generated according to rays scattered by body tissue where the target object is located; processing the actual scattering image or a reference image corresponding to the actual scattering image with a preset model, and determining a location offset of the target object at the time i according to the processing result; and tracking the target object according to the location offset of at least one time. The preset model is indicative of a location conversion relationship of corresponding pixels in images that are formed before and after the rays are scattered.

15 Claims, 6 Drawing Sheets

(56) References Cited

FOREIGN PATENT DOCUMENTS

| | | |
|---|---|---|
| CN | 105574828 A | 5/2016 |
| CN | 109475337 A | 3/2019 |
| CN | 110097611 A | 8/2019 |
| CN | 110997064 A | 4/2020 |
| WO | WO-2019019188 A1 * | 1/2019 ............... A61B 6/00 |
| WO | WO2020044060 A1 | 3/2020 |

* cited by examiner

TARGET OBJECT TRACKING METHOD, TRACKING SYSTEM AND ELECTRONIC DEVICE FOR USE IN RADIOTHERAPY

CROSS-REFERENCE TO RELATED APPLICATIONS

The present disclosure is a continuation of international application No. PCT/CN2020/104977 filed on Jul. 27, 2020, and entitled "Tracking Method and Device", all of which is incorporated herein by reference in its entirety.

TECHNICAL FIELD

Embodiments of the present disclosure relate to the field of radiotherapy, in particular to a tracking method and device.

BACKGROUND

One of the key technologies of radiotherapy is to keep accurate locating of a tumor during radiotherapy. In the process of radiotherapy, the treatment of a tumor in a body tissue by means of rays emitted by a ray source requires the rays to be accurately located on the tumor. If the rays cannot be accurately located, normal tissues around the tumor will be damaged.

SUMMARY

In view of this, one of the technical problems solved by embodiments of the present disclosure is to provide a tracking method and device for overcoming the defects in the prior art that a scattered beam collimating device, such as a pinhole, a grating or other coding device, needs to be added between an irradiated object and a detector, which encroaches on the treatment space and is difficult in engineering implementation.

In a first aspect, an embodiment of the present disclosure provides a tracking method, including: acquiring an actual scattering image of a target object at time i, where i is an integer greater than 0, and the actual scattering image is generated according to rays scattered by a body tissue where the target object is located; processing the actual scattering image or a reference image corresponding to the actual scattering image with a preset model, and determining a location offset of the target object at the time i according to the processing result, the preset model being indicative of a location conversion relationship of corresponding pixels in images that are formed before and after the rays are scattered; and tracking the target object according to the location offset of at least one time, the at least one time including the time i.

In a second aspect, an embodiment of the present disclosure provides a tracking device, including: an acquisition module, an offset module and a tracking module, where the acquisition module is configured to acquire an actual scattering image of a target object at time i, where i is an integer greater than 0, and the actual scattering image is generated according to rays scattered by a body tissue where the target object is located; the offset module is configured to process the actual scattering image or a reference image corresponding to the actual scattering image by using a preset model, and determine a location offset of the target object at the time i according to the processing result, the preset model being indicative of a location conversion relationship of corresponding pixels in images that are formed before and after the rays are scattered; and the tracking module is configured to track the target object according to the location offset of at least one time, the at least one time including the time i.

In a third aspect, an embodiment of the present disclosure provides an electronic device, including a processor and a memory, where the processor and the memory are in communication connection, and the memory stores a computer program; and the processor is configured to execute the computer program to implement the tracking method as described in the first aspect or any embodiment of the first aspect.

In a fourth aspect, an embodiment of the present disclosure provides a tracking system, including: a ray source, a detector and a processor, the detector being electrically connected with the processor, where the ray source is configured to emit rays to a body tissue where a target object is located at time i, where i is an integer greater than 0; the detector is configured to receive the rays scattered on the body tissue, convert the rays into a scattering image generation signal, and send the scattering image generation signal to the processor; and the processor is configured to generate an actual scattering image of the target object according to the scattering image generation signal sent by the detector; process the actual scattering image or a reference image corresponding to the actual scattering image by using a preset model, and determine a location offset of the target object at the time i according to the processing result, the preset model being indicative of a location conversion relationship of corresponding pixels in images that are formed before and after the rays are scattered; and track the target object according to the location offset of at least one time, the at least one time including the time i.

According to the tracking method and device provided by the embodiments of the present disclosure, an actual scattering image of a target object at time i is acquired, where i is an integer greater than 0, and the actual scattering image is generated according to rays scattered by body tissue where the target object is located; the actual scattering image or a reference image corresponding to the actual scattering image is processed by using a preset model, and a location offset of the target object at the time i is determined according to the processing result, the preset model being indicative of a location conversion relationship of corresponding pixels in images that are formed before and after the rays are scattered; and the target object is tracked according to the location offset of at least one time. The preset model indicates the location conversion relationship of the corresponding pixels in the images formed before and after the rays are scattered. As a result, processing the actual scattering image or the reference image corresponding to the actual scattering image by using the preset model may reduce the influence of scattering on the images, and the location offset determined hereby is more accurate. Moreover, a scattered beam collimating device does not need to be added between an irradiated object and a detector, which increases the treatment space and makes the engineering implementation easier.

BRIEF DESCRIPTION OF THE DRAWINGS

Some specific embodiments of the present disclosure are described in detail hereinafter with reference to accompanying drawings in an exemplary manner instead of a non-restrictive manner. In the drawings, like reference numerals denote like or similar components or parts. A person skilled in the art should understand that these drawings are not necessarily drawn to scale. In the drawings.

DETAILED DESCRIPTION

Specific implementations of embodiments of the present disclosure are further explained below with reference to the accompanying drawings in the embodiments of the present disclosure.

The location of a tumor in a treated subject may change during the process of treatment due to breathing of the treated subject and other reasons, and the locating of a tumor in related technologies is not accurate enough, which adversely impacts the treatment effect. In addition, in the related technologies, a scattered beam collimating device, such as a pinhole, a grating or other encoding device, needs to be added between the irradiated subject and a detector, which occupies the treatment space and is difficult in engineering implementation.

Figure 1:
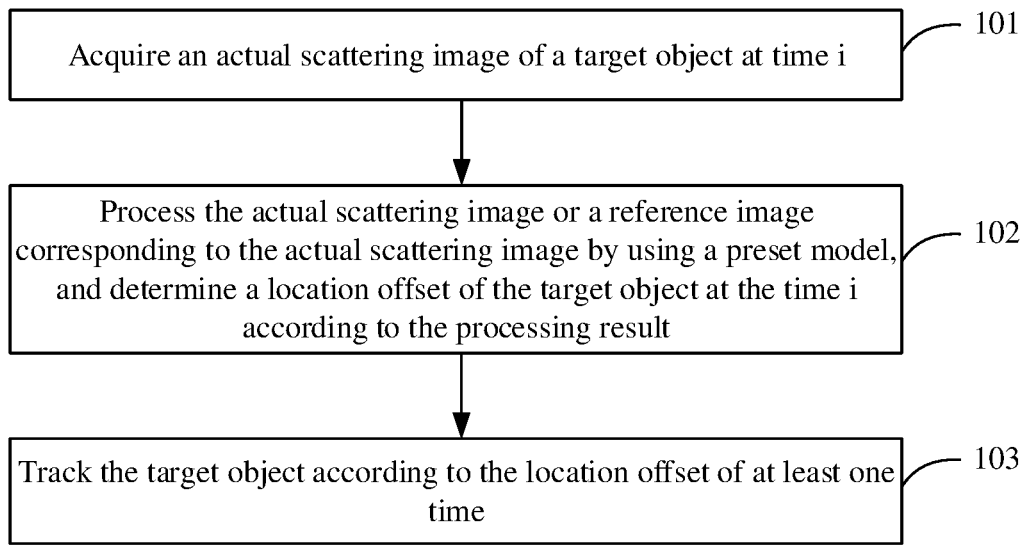
FIG. 1 is a flowchart of a tracking method provided by an embodiment of the present disclosure.

A first embodiment of the present disclosure provides a tracking method, as shown in FIG. 1, which is a flowchart of a tracking method provided in the first embodiment of the present disclosure. The tracking method includes the following steps:

Step 101: Acquire an actual scattering image of a target object at time i.

Herein, i is an integer greater than 0. Namely, i may be equal to 1, 2, 3, and other integers in sequence. The actual scattering image is generated according to rays scattered by a body tissue where the target object is located.

Optionally, the actual scattering image is generated according to the rays scattered after the rays (e.g., X-rays) are irradiated to the body tissue (or an irradiated object) where the target object is located.

The target object may be an object to be tracked, for example, in the process of radiotherapy, the target object may be a tumor to be tracked, and the body tissue where the target object is located may be the body tissue where the tumor of a patient is located.

Here, the time i is described in detail. The time i may be a sampling time. Optionally, the actual scattering image is acquired periodically. The sampling time of the ith period is the time i, and the starting time, middle time or end time of each period may be used as the sampling time of the period. A period may be 1 second, 0.5 second or 2 seconds, or other values. Illustratively, the location of the target object is affected by human breaths, and the time of one human breath is 2-4 seconds. Multiple samples may be collected during the time of one human breath, for example, 10 samples may be collected during the time of one human breath. If the time of one human breath is 3 seconds, the time of a sampling period is 0.3 second. Of course, this is only an exemplary illustration, and the present disclosure is not limited thereto.

Optionally, in an embodiment of the present disclosure, the acquiring an actual scattering image of a target object at time i includes: controlling collimated rays to irradiate the body tissue where the target object is located at the time i; and generating the actual scattering image according to a signal converted from the rays scattered on the body tissue. The actual scattering image formed by the scattered rays acquired after the collimated rays irradiate the body tissue may reflect the situation of a transverse plane of the body tissue corresponding to the rays, and can reflect the location of the target object inside the body, so that the locating is more accurate.

It should be noted that, in the present disclosure, the rays scattered by the body tissue may not undergo beam collimation by any beam collimating device, but directly received by a detector. For example, further optionally, in an embodiment of the present disclosure, the generating the actual scattering image according to a signal converted from the rays scattered on the body tissue includes: controlling the detector to receive the rays scattered on the body tissue; receiving the signal sent by the detector, the signal being converted from the rays scattered; and generating the actual scattering image according to the signal. Because the rays do not undergo beam collimation by any beam collimating device, the detector receives more scattered rays, which is more conducive to imaging. In addition, the beam collimating device is not added between the irradiated object and the detector, so that the treatment space will not be encroached due to the setting of the beam collimating device, the treatment space is saved, and the engineering implementation is easier. It should be noted that, in an optional implementation manner, the scattered rays are directly received by the detector without beam collimation, or the scattered rays are received by the detector after beam collimation lower than a preset beam collimation requirement. The preset beam collimation requirement may include a preset amount of rays blocked per unit time that fail to arrive at the detector. Therefore, lower than the preset beam collimation requirement indicates that the amount of rays arriving at the detector per unit time increases. Of course, the meaning of the preset beam collimation requirement is only explained by the amount of rays here, and it may also be defined in other ways. For example, lower than the preset beam collimation requirement may indicate that the diameter of the beam collimating device is greater than a preset size. For another example, lower than the preset beam collimation requirement may indicate that the amount of rays arriving at the detector per unit time is greater than a preset value. Of course, this is only an exemplary illustration, and the present disclosure is not limited thereto.

Optionally, in an embodiment of the present disclosure, the controlling collimated rays to irradiate the body tissue where the target object is located at the time i includes: controlling the rays collimated by a first beam collimating device to irradiate the body tissue where the target object is located at the time i. The first beam collimating device may be provided with one or more narrow slits or slots, and the rays pass through the first beam collimating device to form a linear beam (also known as a narrow slit beam).

Optionally, in an embodiment of the present disclosure, the controlling the rays collimated by a first beam collimating device to irradiate the body tissue where the target object is located at the time i includes: controlling a ray source to emit rays through the first beam collimating device to the body tissue where the target object is located at the time i.

Optionally, in another embodiment of the present disclosure, the acquiring an actual scattering image of a target object at time i includes: generating the actual scattering image according to the rays cumulatively scattered by the body tissue where the target object is located between time i−1 and the time i. For example, with the passage of time, signals converted from the scattered rays are continuously accumulated between the time i−1 and the time i, and when the number of photons in the accumulated signals reaches a preset value, the actual scattering image is formed. Because the actual scattering image formed by accumulating the signals converted from the scattered rays includes more photons, the image is clearer, which is beneficial to further determining a location offset of the target object and improving the accuracy.

Step 102: Process the actual scattering image or a reference image corresponding to the actual scattering image by using a preset model, and determine a location offset of the target object at the time i according to the processing result.

The reference image may be acquired by simulation tracking, for example, in a scenario of tumor treatment, the reference image may be acquired by simulation tracking before treatment. The reference image may be an image corresponding to the actual scattering image at the time i, and the reference image may be a computed tomography (CT) image or a nuclear magnetic resonance (MR) image acquired before treatment. Of course, this is only an exemplary illustration, and the present disclosure is not limited thereto.

The preset model is indicative of a location conversion relationship of corresponding pixels in images that are formed before and after the rays are scattered, and it may also be said that the preset model may simulate a scattering process. For example, an image before scattering is input to the preset model for a forward operation to acquire an image after scattering. For another example, an image after scattering is input to the preset model for an inverse operation to acquire an image before scattering. Optionally, in an embodiment of the present disclosure, the preset model is a convolution model or a deconvolution model; and the processing a reference image by using the preset model to acquire a reference scattering image includes: acquiring at least one scattering sample point of the actual scattering image and at least one reference sample point of the reference image; and performing convolution processing by using the convolution model according to the at least one reference sample point to convert the reference image into the target image comparable to the actual scattering image; or, performing deconvolution processing by using the deconvolution model according to the at least one scattering sample point to convert the actual scattering image into the reference scattering image comparable to the reference image. Here, two examples are listed for illustration:

Optionally, in a first example, the processing the actual scattering image or a reference image by using a preset model, and determining a location offset of the target object at the time i according to the processing result includes: processing the actual scattering image by using the preset model to acquire a target image; and comparing the target image with the reference image, and determining the location offset of the target object at the time i according to the comparison result. Further optionally, the preset model may be a deconvolution model, and the processing the actual scattering image by using the preset model to acquire a target image includes: performing deconvolution processing on the actual scattering image by using the deconvolution model to acquire the target image. It should be noted that in the first example, a forward operation (for example, forward convolution processing) may be performed on the actual scattering image by using the preset model to acquire the target image, where the preset model may simulate an inverse process of scattering; or, an inverse operation (for example, reverse convolution processing) may be performed on the actual scattering image by using the preset model to acquire the target image, where the preset model may simulate a scattering process.

Optionally, in a second example, the processing the actual scattering image or a reference image by using a preset model, and determining a location offset of the target object at the time i according to the processing result includes: processing the reference image by using the preset model to acquire a reference scattering image; and comparing the reference scattering image with the actual scattering image, and determining the location offset of the target object at the time i according to the comparison result. Further optionally, the preset model may be a convolution model, and the processing the reference image by using the preset model to acquire a reference scattering image includes: performing convolution processing on the reference image by using the convolution model to acquire the reference scattering image. It should be noted that in the second example, a forward operation may be performed on the reference image by using the preset model to acquire the reference scattering image, where the preset model may simulate a scattering process; or an inverse operation may be performed on the reference image by using the preset model to acquire the reference scattering image, where the preset model may simulate an inverse process of scattering.

Combining the first example with the second example, the preset model may indicate the location conversion relationship of corresponding pixels in the images formed before and after the rays are scattered, the corresponding pixels may be pixels corresponding to the same point on the body tissue before and after the rays are scattered, and the conversion relationship may include a coordinate conversion relationship and a gray value conversion relationship. Of course, this is only an exemplary illustration, and the present disclosure is not limited thereto. By using the preset model to simulate the scattering process, the reference image may be converted into the reference scattering image after scattering simulation, the reference scattering image is compared with the actual scattering image, and because the two images are images formed after ray scattering, the determined location offset is more accurate; or by using the preset model to simulate the inverse process of scattering, the actual scattering image is converted into the target image formed without scattering of rays, the target image is compared with the reference image, and because the two images are images formed without scattering of rays, the unique offset determined is more accurate.

It should be noted that in a first application scenario, the preset model may be a neural network model, and the neural network model may be trained by using sample scattering images and sample reference images acquired in advance. Optionally, in an embodiment of the present disclosure, the preset model is a neural network model; and the method further includes: acquiring at least one sample scattering image and at least one corresponding sample reference image; and training the neural network model by using the at least one sample scattering image and the at least one sample reference image. The sample reference image is an image formed without scattering of rays, and the sample scattering image is an image formed after ray scattering. For example, if the preset model is trained to be a model capable of simulating a scattering process, the sample reference image is input into the preset model to acquire an output image, the output image is compared with the sample scattering image, parameters in the preset model are adjusted according to the comparison result, and then the next sample reference image is input until the training is completed. For another example, if the preset model is trained to be a model capable of simulating an inverse process of scattering, the sample scattering image is input into the preset model to acquire an output image, the output image is compared with the sample reference image, the parameters in the preset model are adjusted according to the comparison result, and then the next sample scattering image is input until the training is completed. Of course, this is only an exemplary illustration, and the present disclosure is not limited thereto.

Optionally, in a second application scenario, the preset model is a probability model; and the method further includes:

acquiring at least one scattering sample point of the actual scattering image and at least one reference sample point of the reference image; and calculating, according to the at least one scattering sample point and the at least one reference sample point, parameters in the probability model by using Monte Carlo simulation.

Step 103: Track the target object according to the location offset of at least one time.

The at least one time includes the time i. The target object at the time i may be tracked according to the location offset at the time i, and the target object may be continuously tracked in real time according to the location offset of at least one time. It should be noted that the location offset may indicate an offset of the target object based on the reference image, that is, an offset between the current location of the target object and the location of the target object in the reference image.

According to the tracking method provided by the embodiment of the present disclosure, an actual scattering image of a target object at time i is acquired, where i is an integer greater than 0, and the actual scattering image is generated according to rays scattered by body tissue where the target object is located; the actual scattering image or a reference image corresponding to the actual scattering image is processed by using a preset model, and a location offset of the target object at the time i is determined according to the processing result, the preset model being used for indicating a location conversion relationship of corresponding pixels in images formed before and after the rays are scattered; and the target object is tracked according to the location offset of at least one time. Because the preset model may indicate the location conversion relationship of the corresponding pixels in the images formed before and after ray scattering, processing the actual scattering image or the reference image corresponding to the actual scattering image by using the preset model may reduce the influence of scattering on the images, and the location offset determined hereby is more accurate. Moreover, any scattered beam collimating device does not need to be added between an irradiated object and a detector, which does not occupy the treatment space and makes the engineering implementation easier.

It should be noted that the tracking method provided by the embodiment of the present disclosure may also be applied to the case where a second beam collimating device is disposed between the irradiated object and the scattering detector. The second beam collimating device may be a pinhole collimator or a slat collimator, which is of course illustrative herein and may also be a second beam limiter in other shape.

Based on the tracking method described in the embodiment, another embodiment of the present disclosure combines the description of steps 101-103 of the previous embodiment, and takes a tumor as an example of the target object to explain in detail the tracking method provided in the embodiment of the present disclosure in a tumor treatment scenario.

Figure 2A:
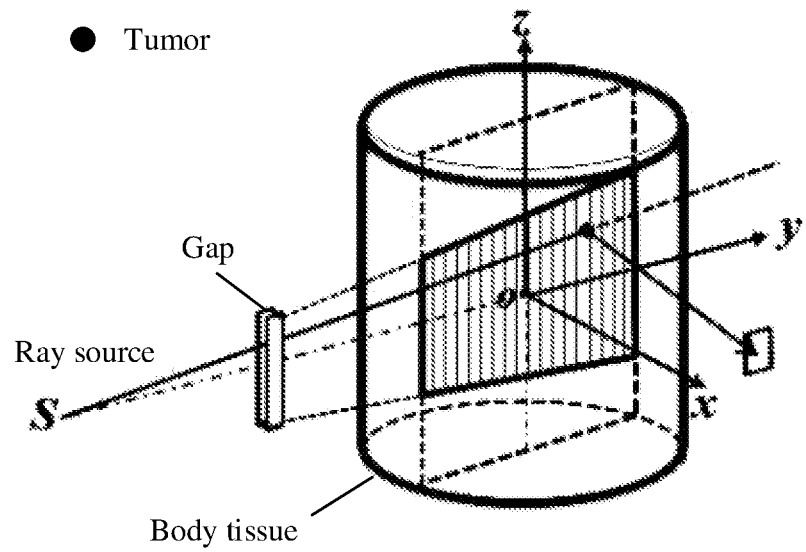
FIG. 2A is a schematic diagram of a tumor treatment scenario provided in an embodiment of the present disclosure.

As shown in FIG. 2A, which is a schematic diagram of a tumor treatment scenario provided in an embodiment of the present disclosure, where a ray source S may emit X-rays. After beam collimation by means of a slit (a first beam collimator), the rays irradiate body tissue (irradiated object) where a tumor is located. Because the X-rays have penetrating power, the energy of the X-rays gradually decays after the rays irradiate the body tissue along the y axis. Because different parts of different body tissue have different absorption abilities for the X-rays, the scattered X-rays may represent different parts of the body tissue because of different energy.

In the first application scenario, any scattered beam collimator is not disposed between the irradiated object and the scattering detector, and the scattering detector may directly collect the scattered rays on the body tissue and send same to a processor.

The processor may acquire an actual scattering image of the tumor at time i, where i is an integer greater than 0. Namely, i may be 1, 2, 3, and other integers in sequence. The actual scattering image is generated according to rays scattered by body tissue where the tumor is located; process the actual scattering image or a reference image corresponding to the actual scattering image by using a preset model, and determine a location offset of the tumor at the time i according to the processing result, the preset model being used for indicating a location conversion relationship of corresponding pixels in images formed before and after ray scattering; and track the tumor according to the location offset of at least one time. Because the preset model may indicate the location conversion relationship of the corresponding pixels in the images formed before and after ray scattering, processing the actual scattering image or the reference image corresponding to the actual scattering image by using the preset model may reduce the influence of scattering on the images, and the location offset determined hereby is more accurate. No scattered beam collimating device is disposed between the irradiated object and the detector. Thus, the treatment space is not occupied by the beam collimating device and the engineering implementation is rendered easier.

In the second application scenario, a second beam collimating device is disposed between the irradiated object and the scattering detector, and the scattered rays after beam collimation by the second beam collimating device are received by the scattering detector and sent to the processor. The processor tracks the tumor by using the tracking method as described in the first application scenario in this embodiment (or the previous embodiment). The actual scattering image finally generated from the rays after beam collimation by the second beam collimating device is clearer, which is beneficial to improving the accuracy of locating. However, the second beam collimating device occupies a part of the treatment space to reduce the treatment space.

The second beam collimating device may be provided with a pinhole collimator, the size of which is greater than or equal to 1 cm. For example, the second beam collimating device may be a pinhole collimator or a slat collimator. This is illustrated by the following two examples.

Figure 2B:
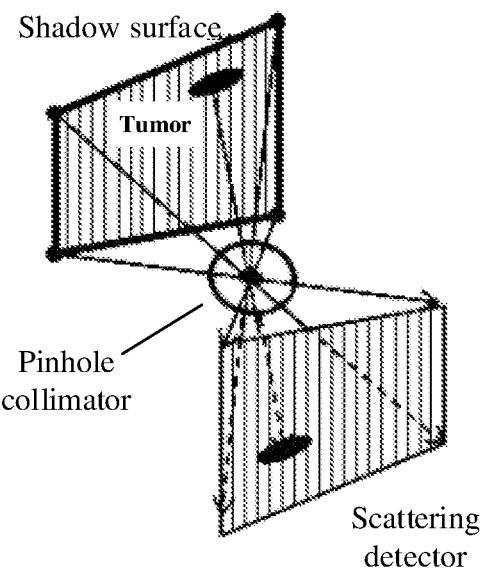
FIG. 2B is a schematic diagram of an application scenario of a pinhole collimator provided in an embodiment of the present disclosure.

In the first example, as shown in FIG. 2B, which is a schematic diagram of an application scenario of a pinhole collimator provided in the present disclosure, scattered rays received by a scattering detector may be rays that undergo beam collimation by the pinhole beam collimator. The scattered rays, after passing through the pinhole collimator, are projected on the scattering detector based on the principle of pinhole imaging, and an actual scattering image may thus be acquired. Before passing through the pinhole collimator, because the scattered rays are reflected in all directions, the actual scattering image acquired by directly collecting the scattered rays is greatly interfered and unclear. After passing through the pinhole collimator, the scattered rays reflected from various parts of body tissue to the pinhole are retained, and the scattered rays from other directions are filtered out, so the actual scattering image acquired is clearer. It should be noted that the diameter of the pinhole in the pinhole collimator is greater than or equal to 1 cm in the embodiment. If the diameter is too small, a few rays pass through the pinhole collimator, causing the actual scattering image acquired to be too light. If the diameter is too large, too many rays pass through the pinhole collimator, and for the rays scattered from a body part, the rays from multiple directions may pass through the pinhole collimator, causing the actual scattering image acquired to be unclear. In the present disclosure, the diameter of the pinhole is increased, or any pinhole collimator is not disposed, but the scattering process is simulated by using a preset model, so that the reference image may be converted into a reference scattering image acquired after ray scattering, or the actual scattering image may be converted into a target image acquired without scattering of rays, and the actual scattering image acquired after ray scattering is compared with the reference scattering image, or the target image acquired without scattering of rays is compared with the reference image; therefore, the location offset acquired by comparing the same type of images is more accurate. The cases where the location offset cannot be determined because the actual scattering image is too light due to the small diameter and the location offset cannot be determined because the actual scattering image is unclear due to the large diameter are avoided.

Figure 2C:
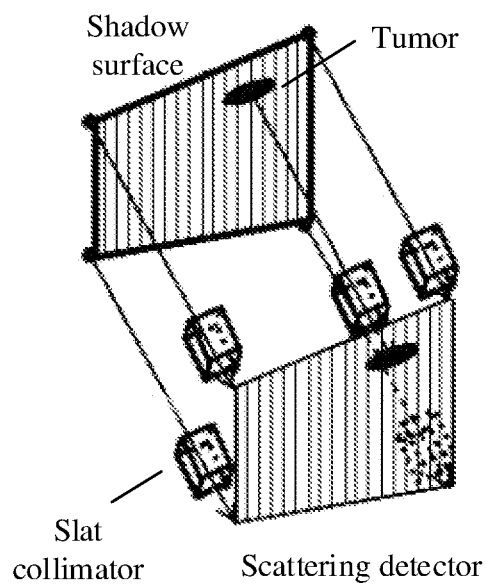
FIG. 2C is a schematic diagram of an application scenario of a slat collimator provided by the second embodiment of the present disclosure.

In the second example, as shown in FIG. 2C, which is a schematic diagram of an application scenario of a slat collimator provided in the second embodiment of the present disclosure, scattered rays received by a scattering detector may be rays that undergo beam collimation by the slat collimator. In the example, the width of grid holes in the slat collimator is greater than or equal to 1 cm, the rays passing through the slat collimator may be increased by increasing the width of the grid holes in the slat collimator, and the thickness of louver blades may be decreased or/and the density of louver blades may be decreased to increase the rays passing through the slat collimator. It should be noted that, compared with the pinhole collimator, the slat collimator may be directly mounted on the scattering detector without occupying too much space.

Of course, the actual scattering image may also be acquired by other types of second beam collimators, which is only illustrative here, and the present disclosure is not limited thereto.

It should be noted that, with the passage of time, signals converted from the scattered rays passing through the second beam collimator are accumulated on the detector from the time i−1 to the time i; when the number of photons on the detector reaches a preset value, an actual scattering image is generated; and the more the photons are, the higher the signal-to-noise ratio of the actual scattering image is.

The actual scattering image may be collected periodically. Usually, the time of one human breath is 2-4 seconds, and multiple samples may be collected during one human breath, which can better track the tumor, that is, the value acquired by dividing the time of one human breath by the number of sample collections is taken as the duration of a sampling period. With the passage of time, the location of the tumor at the time i is different from that at the time i−1 or i+1, and correspondingly, the locations of the tumor in the actual scattering images acquired at different time are also different.

A location offset of the tumor may be acquired by comparing the actual scattering image at the time i with the corresponding reference image at the time i. Specifically, the actual scattering image may be processed by using the preset model to acquire a target image, and the location offset may be acquired by comparing the target image with the reference image; or the reference image may be processed by using the preset model to acquire a reference scattering image, and the location offset may be acquired by comparing the reference scattering image with the actual scattering image. The specific process is not described here again.

Figure 3:
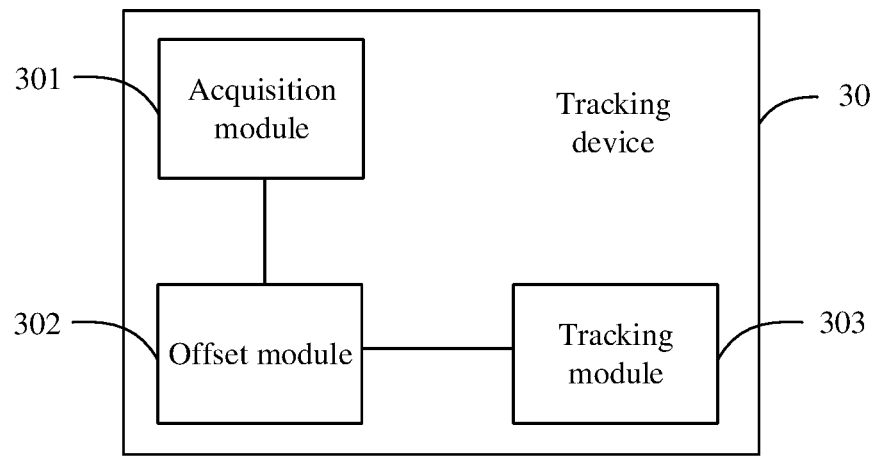
FIG. 3 is a structural block diagram of a tracking device provided in an embodiment of the present disclosure.

Based on the tracking methods described in the embodiments above, a tracking device is present disclosure provided for executing the tracking methods described in the embodiments above. With reference to FIG. 3, the tracking device 30 includes: an acquisition module 301, an offset module 302 and a tracking module 303.

The acquisition module 301 is configured to acquire an actual scattering image of a target object at time i, where i is an integer greater than 0, and the actual scattering image is generated according to rays scattered by the body tissue where the target object is located;

The offset module 302 is configured to process the actual scattering image or a reference image corresponding to the actual scattering image by using a preset model, and determine a location offset of the target object at the time i according to the processing result, the preset model being used for indicating a location conversion relationship of corresponding pixels in images formed before and after ray scattering; and The tracking module 303 is configured to track the target object according to the location offset of at least one time, the at least one time including the time i.

Figure 4:
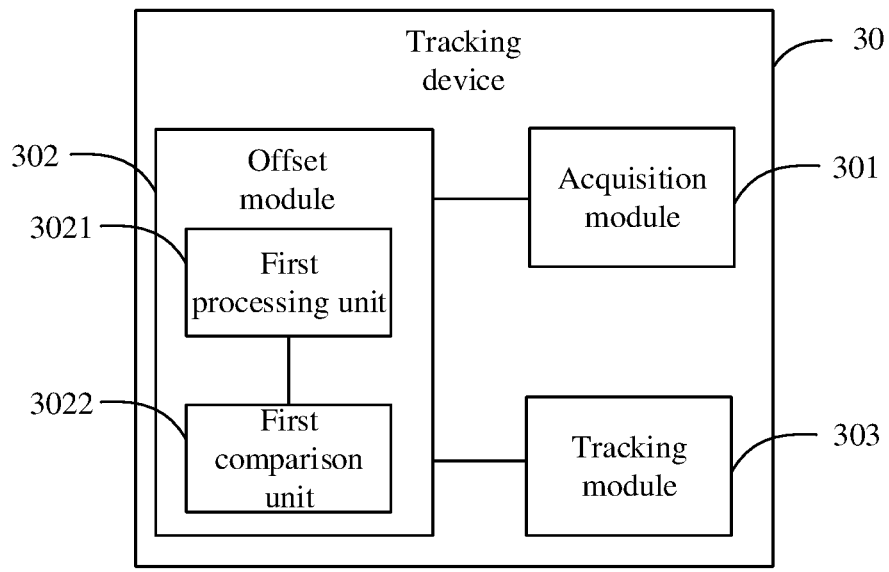
FIG. 4 is a structural block diagram of a tracking device provided in an embodiment of the present disclosure.

Optionally, in an embodiment of the present disclosure, as shown in FIG. 4, the offset module 302 includes a first processing unit 3021 and a first comparison unit 3022.

The first processing unit 3021 is configured to process the actual scattering image by using the preset model to acquire a target image; and The first comparison unit 3022 is configured to compare the target image with the reference image and determine the location offset at the time i according to the comparison result.

Optionally, in an embodiment of the present disclosure, the preset model is a deconvolution model, and the first processing unit 3021 is configured to perform deconvolution processing on the actual scattering image by using the deconvolution model to acquire the target image.

Figure 5:
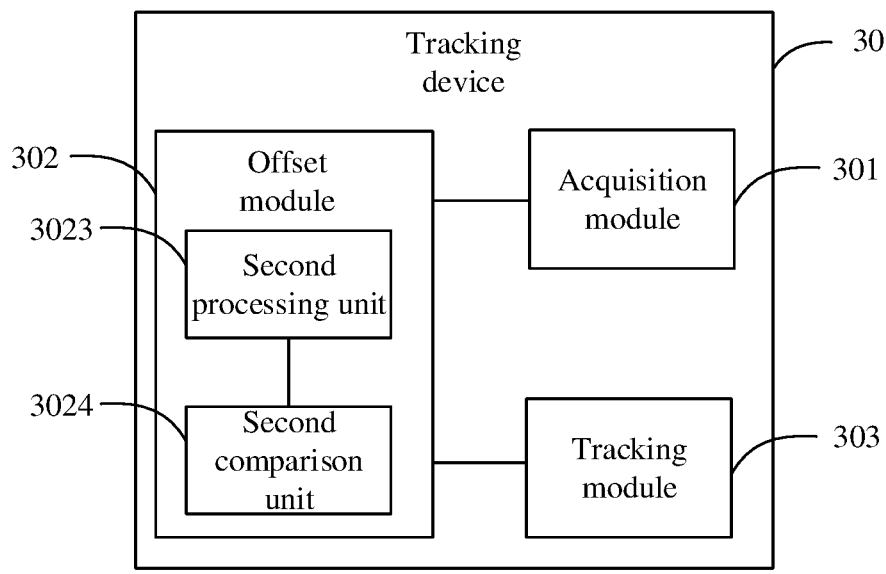
FIG. 5 is a structural block diagram of a tracking device provided in an of the present disclosure.

Optionally, in an embodiment of the present disclosure, as shown in FIG. 5, the offset module 302 includes a second processing unit 3023 and a second comparison unit 3024.

The second processing unit 3023 is configured to process the reference image by using the preset model to acquire a reference scattering image; and The second comparison unit 3024 is configured to compare the reference scattering image with the actual scattering image and determine the location offset at the time i according to the comparison result.

Optionally, in an embodiment of the present disclosure, the preset model is a convolution model, and the second processing unit 3023 is configured to perform convolution processing on the reference image by using the convolution model to acquire the reference scattering image.

Optionally, in an embodiment of the present disclosure, the offset module 302 is configured to acquire at least one scattering sample point of the actual scattering image and at least one reference sample point of the reference image; and perform convolution processing by using the convolution model according to the at least one reference sample point to convert the reference image into the target image comparable to the actual scattering image; or, perform deconvolution processing by using the deconvolution model according to the at least one scattering sample point to convert the actual scattering image into the reference scattering image comparable to the reference image.

Figure 6:
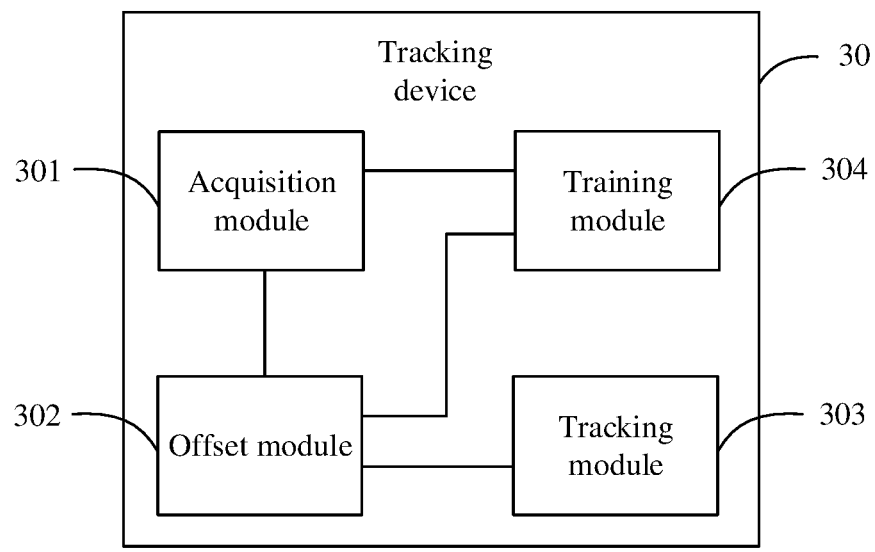
FIG. 6 is a structural block diagram of a tracking device provided in an of the present disclosure.

Optionally, in an embodiment of the present disclosure, as shown in FIG. 6, the tracking device 30 further includes a training module 304.

The acquisition module 301 is further configured to acquire at least one sample scattering image and at least one corresponding sample reference image; and The training module 304 is configured to train a neural network model by using the at least one sample scattering image and the at least one sample reference image.

Figure 7:
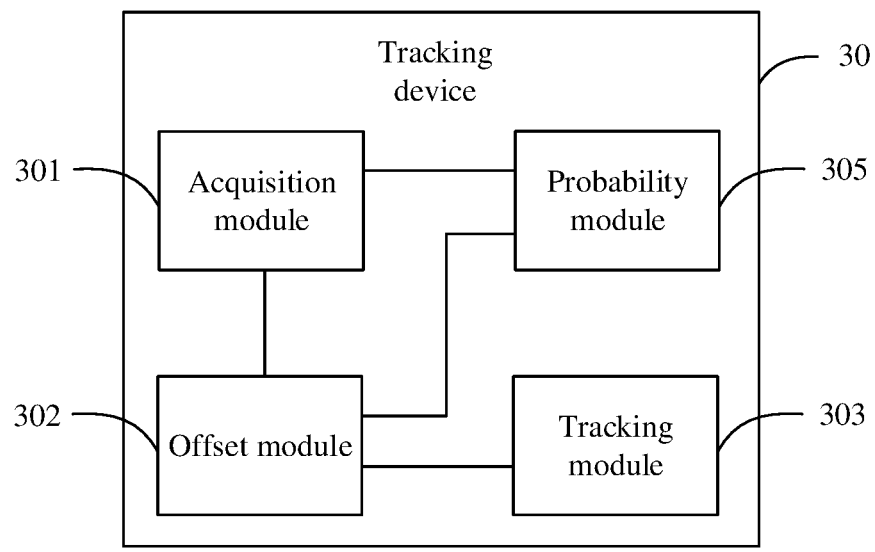
FIG. 7 is a structural block diagram of a tracking device provided in an embodiment of the present disclosure.

Optionally, in an embodiment of the present disclosure, as shown in FIG. 7, the tracking device 30 further includes a probability module 305.

The acquisition module 301 is further configured to acquire at least one scattering sample point of the actual scattering image and at least one reference sample point of the reference image; and The probability module 305 is configured to calculate, according to the at least one scattering sample point and the at least one reference sample point, parameters in a probability model by using Monte Carlo simulation.

Figure 8:
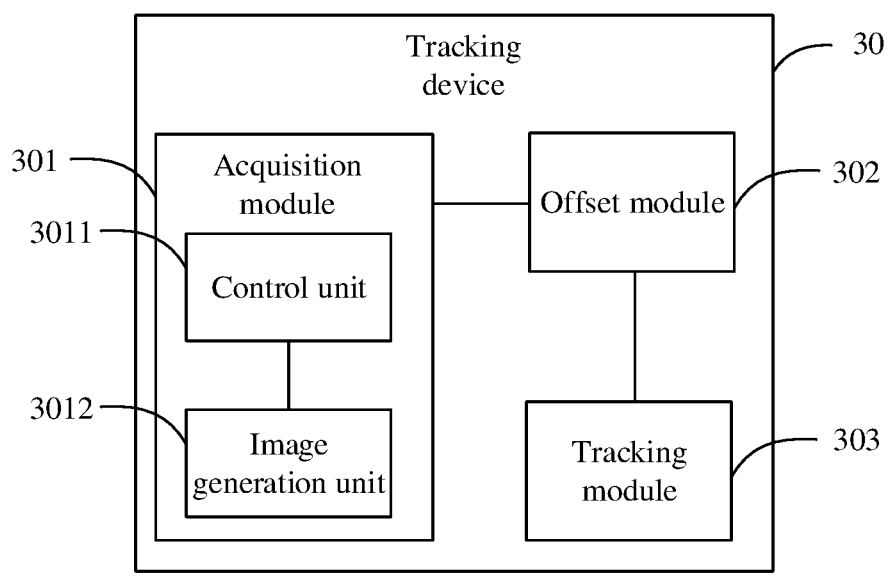
FIG. 8 is a structural block diagram of a tracking device provided in an embodiment of the present disclosure.

Optionally, in an embodiment of the present disclosure, as shown in FIG. 8, the acquisition module 301 includes a control unit 3011 and an image generation unit 3012.

The control unit 3011 is configured to control collimated rays to irradiate the body tissue where the target object is located at the time i; and The image generation unit 3012 is configured to generate the actual scattering image according to a signal converted from the rays scattered on the body tissue.

Optionally, in an embodiment of the present disclosure, the image generation unit 3012 is configured to control a detector to receive the rays scattered on the body tissue; receive the signal sent by the detector, the signal being converted from the rays scattered; and generate the actual scattering image according to the signal.

Optionally, in an embodiment of the present disclosure, the scattered rays are directly received by the detector without beam collimation, or the scattered rays are received by the detector after beam collimation lower than a preset beam collimation requirement.

Optionally, in an embodiment of the present disclosure, the control unit 3011 is configured to control a ray source to emit rays through a first beam collimator to the body tissue where the target object is located at the time i.

Optionally, in an embodiment of the present disclosure, the image generation unit 3012 is specifically configured to generate the actual scattering image from the rays scattered on the body tissue and scattered by a second beam collimator.

Optionally, in an embodiment of the present disclosure, the acquisition module 301 is further configured to generate the actual scattering image according to the rays cumulatively scattered by the body tissue where the target object is located between time i–1 and the time i.

According to the tracking device provided by the embodiment of the present disclosure, an actual scattering image of a target object at time i is acquired, where i is an integer greater than 0, and the actual scattering image is generated according to rays scattered by the body tissue where the target object is located; the actual scattering image or a reference image corresponding to the actual scattering image is processed by using a preset model, and a location offset of the target object at the time i is determined according to the processing result, the preset model being used for indicating a location conversion relationship of corresponding pixels in images formed before and after ray scattering; and the target object is tracked according to the location offset of at least one time. Because the preset model may indicate the location conversion relationship of the corresponding pixels in the images formed before and after ray scattering, processing the actual scattering image or the reference image corresponding to the actual scattering image by using the preset model may reduce the influence of scattering on the images, and the location offset determined hereby is more accurate.

Figure 9:
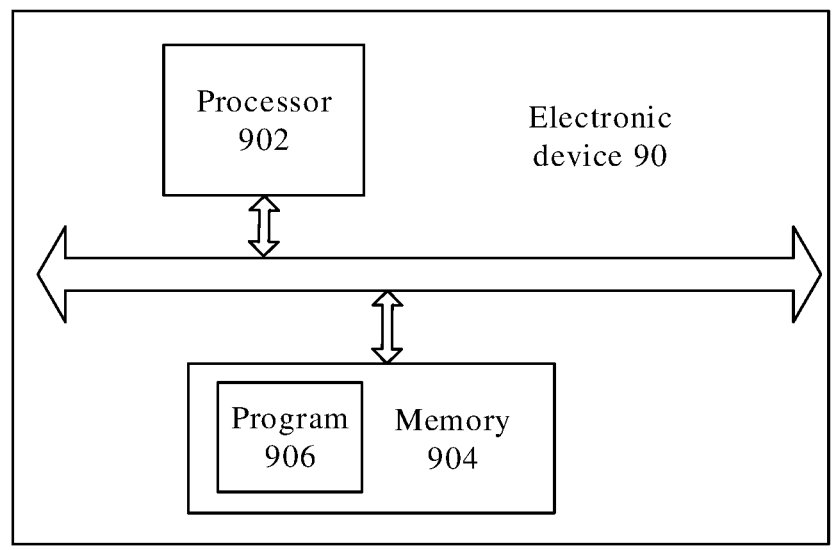
FIG. 9 is a structural diagram of an electronic device provided in an embodiment of the present disclosure.

Based on the tracking methods described in the embodiments above, an embodiment of the present disclosure provides an electronic device for executing the tracking method described in the embodiments above. As shown in FIG. 9, the electronic device 90 includes at least one processor (processor) 902 and a memory (memory) 904, which are in communication connection.

A computer program 906 is stored in the memory 904; and

The processor 902 is configured to execute the program 906, and may specifically execute the related steps of the tracking methods described in the embodiments above.

Specifically, the program 906 may include program codes including computer operation instructions.

The processor 902 may be a central processing unit CPU, or an application specific integrated circuit ASIC (Application Specific Integrated Circuit), or one or more integrated circuits configured to implement the embodiments of the present disclosure. The electronic device includes one or more processors, which may be processors of the same type, such as one or more CPUs, and may also be processors of different types, such as one or more CPUs and one or more ASICs.

The memory 904 may include a high-speed random access memory RAM, and may also include a non-volatile memory (non-volatile memory), for example, at least one magnetic disc memory.

According to the electronic device provided by the embodiment of the present disclosure, an actual scattering image of a target object at time i is acquired, where i is an integer greater than 0, and the actual scattering image is generated according to rays scattered by the body tissue where the target object is located; the actual scattering image or a reference image corresponding to the actual scattering image is processed by using a preset model, and a location offset of the target object at the time i is determined according to the processing result, the preset model being used for indicating a location conversion relationship of corresponding pixels in images formed before and after ray scattering; and the target object is tracked according to the location offset of at least one time. Because the preset model may indicate the location conversion relationship of the corresponding pixels in the images formed before and after ray scattering, processing the actual scattering image or the reference image corresponding to the actual scattering image by using the preset model may reduce the influence of scattering on the images, and the location offset determined hereby is more accurate.

Figure 10:
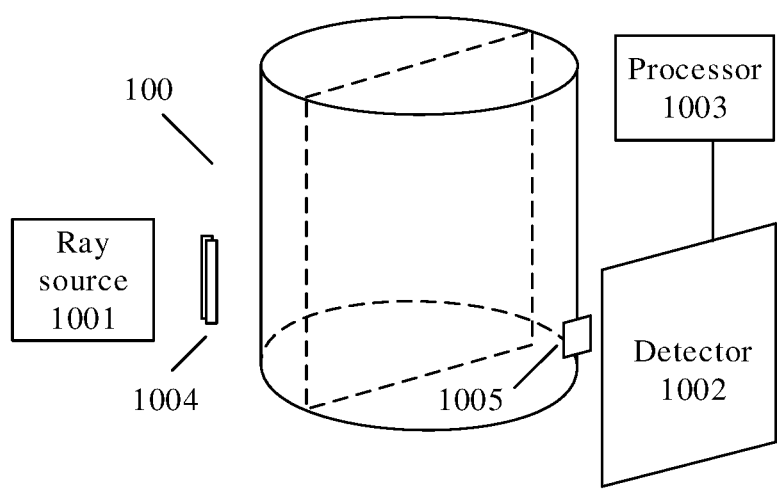
FIG. 10 is a structural diagram of a tracking system provided in an embodiment of the present disclosure.

Based on the tracking methods described in the embodiments above, an embodiment of the present disclosure provides a tracking system for executing the tracking methods described in the embodiments above. As shown in FIG. 10, the tracking system 100 includes a ray source 1001, a detector 1002 and a processor 1003, where the detector 1002 is electrically connected with the processor 1003;

The ray source 1001 is configured to emit rays to a body tissue where a target object is located at time i, where i is an integer greater than 0;

The detector 1002 is configured to receive the rays scattered on the body tissue, convert the rays into a scattering image generation signal, and send the scattering image generation signal to the processor 1003; and The processor 1003 is configured to generate an actual scattering image of the target object according to the scattering image generation signal sent by the detector 1002; process the actual scattering image or a reference image corresponding to the actual scattering image by using a preset model, and determine a location offset of the target object at the time i according to the processing result, the preset model being used for indicating a location conversion relationship of corresponding pixels in images formed before and after ray scattering; and track the target object according to the location offset of at least one time, the at least one time including the time i.

It should be noted that the scattered rays received by the detector 1002 may be received when the detector 1002 is in a position not right against the ray source 1001. Here, two examples are given to illustrate two cases where the detector 1002 is in a position not right against the ray source 1001.

Optionally, in a first example of the present disclosure, the detector 1002 is configured to, when moving to the position not right against the ray source 1001, receive the rays scattered on the body tissue, convert the rays into the scattering image generation signal, and send the scattering image generation signal to the processor 1003.

Optionally, the scattered rays are directly received by the detector 1002 without beam collimation.

In the first example, the detector 1002 may be movable relative to the ray source 1001, and the detector 1002 may receive direct rays for imaging when the detector 1002 is in the position right against the ray source 1001. For example, optionally, in an embodiment of the present disclosure, the detector 1002 is further configured to, when moving to the position right against the ray source 1001, receive direct rays passing through the body tissue, convert the rays into a direct image generation signal, and send the direct image generation signal to the processor 1003; and the processor 1003 is further configured to generate an actual direct image of the target object according to the direct image generation signal sent by the detector 1002 and perform image reconstruction and image registration according to the actual direct image. When the detector 1002 is in the position right against the ray source 1001, the detector 1002 may receive the scattered rays for imaging. Because a second beam collimator does not need to be disposed between the detector 1002 and the body tissue, the detector 1002 may perform not only scattering imaging but also direct imaging.

Optionally, in a second example of the present disclosure, the ray source 1001 includes a first ray source and a second ray source, and the detector 1002 includes a first detection plate and a second detection plate; the first ray source is directly opposite the first detection plate, and the second ray source is directly opposite the second detection plate;

The detector 1002 is configured to receive, by means of the first detection plate, the rays emitted by the second ray source and scattered on the body tissue, convert the rays into a first scattering image generation signal, and send the first scattering image generation signal to the processor 1003, and correspondingly, the processor 1003 is configured to generate a first actual scattering image of the target object according to the first scattering image generation signal sent by the detector 1002; or, receive, by means of the second detection plate, the rays emitted by the first ray source and scattered on the body tissue, convert the rays into a second scattering image generation signal, and send the second scattering image generation signal to the processor 1003, and correspondingly, the processor 1003 is configured to generate a second actual scattering image of the target object according to the second scattering image generation signal sent by the detector 1002.

Optionally, the scattered rays are directly received by the first detection plate or the second detection plate without beam collimation.

In the second example, the first ray source is directly opposite the first detection plate, the second ray source directly opposite the second detection plate, and the first detection plate may receive the rays directly emitted by the first ray source for direct imaging, and may also receive the scattered rays emitted by the second ray source for scattering imaging; and similarly, the second detection plate may receive the rays directly emitted by the second ray source for direct imaging, and may also receive the scattered rays emitted by the first ray source for scattering imaging.

Combining the first example and the second example described above, the detector 1002 may perform direct ray imaging and scattering ray imaging in the two examples, so the detector 1002 realizes two functions without adding the hardware structure of the tracking system 100, and there are more device functions.

Optionally, in an embodiment of the present disclosure, the tracking system 100 further includes a first beam collimator 1004 between the ray source 1001 and the target object, and the first beam collimator 1004 may be provided with one or more slits, so that the rays emitted by the ray source 1001 are collimated and cover the target object. Exemplarily, the rays may partially or completely cover the target object.

Optionally, in an embodiment of the present disclosure, the scattered rays are directly received by the detector 1002 without beam collimation, or the scattered rays are received by the detector 1002 after beam be collimated lower than a preset beam collimation requirement.

Further optionally, in an embodiment of the present disclosure, the tracking system 100 further includes a second beam collimator 1005 between the target object and the detector, so that the rays scattered on the body tissue are collimated to rays lower than a standard beam collimation requirement.

According to the tracking system provided by the embodiment of the present disclosure, a processor acquires an actual scattering image of a target object at time i, where i is an integer greater than 0, and the actual scattering image is generated according to rays scattered by the body tissue where the target object is located; processes the actual scattering image or a reference image corresponding to the actual scattering image by using a preset model, and determines a location offset of the target object at the time i according to the processing result, the preset model being used for indicating a location conversion relationship of corresponding pixels in images formed before and after ray scattering; and tracks the target object according to the location offset of at least one time. Because the preset model may indicate the location conversion relationship of the corresponding pixels in the images formed before and after ray scattering to simulate a scattering process, processing the actual scattering image or the reference image corresponding to the actual scattering image by using the preset model may reduce the influence of scattering changes on the images, and the location offset determined hereby is more accurate. Moreover, any scattered beam collimator does not need to be added between the irradiated object and the detector, which increases the treatment space and makes the engineering implementation easier.

The devices, modules or units illustrated in the foregoing embodiments may be implemented by a computer chip, an entity, or a product having certain function. A typical implementation device is a computer. Specifically, the computer may be, for example, a personal computer, a laptop computer, a cellular phone, a camera phone, a smart phone, a personal digital assistant, a media player, a navigation device, an E-mail device, a game console, a tablet computer, a wearable device, or a combination of any of these devices.

For the convenience of description, when the above apparatus is described, the functions may be described by various units respectively. Of course, when the present disclosure is implemented, the functions of respective units may be implemented in the same or more software programs and/or hardware programs.

It should be appreciated by those skilled in the art that the embodiments of the present disclosure may be provided as a method, a device, or a computer program product. Therefore, the present disclosure may be in the form of a full hardware embodiment, a full software embodiment, or an embodiment combining software and hardware. In addition, the present disclosure may be in the form of a computer program product implemented on one or more computer available storage media (including but not limited to a disk memory, a CD-ROM, an optical memory, etc.) including computer available program codes.

It is worthwhile to note that the terms "include", "contain", or any variants thereof are intended to cover a non-exclusive inclusion. As such, a process, method, commodity, or device including a series of elements not only includes these elements, but further includes other elements not definitely listed, or further includes inherent elements of the process, method, commodity, or device. In the absence of more limitations, an element limited by "include a . . . " does not exclude other same elements existing in the process, method, commodity, or device including the element.

Each embodiment in the present specification is described in a progressive manner, the same or similar parts between the various embodiments can refer to each other, and each embodiment focuses on the differences from other embodiments. Particularly, the device embodiments are substantially similar to the method embodiments and therefore are briefly described, and reference may be made to the method embodiments for the related parts.

Described above are merely embodiments of the present disclosure, and the present disclosure is not limited thereto. Various modifications and variations may be made to the present disclosure for those skilled in the art. Any modification, equivalent substitution, improvement, and the like made within the spirit and principle of the present disclosure shall fall into the scope of the claims of the present disclosure.

What is claimed is:

1. A tracking method, comprising:
   acquiring an actual scattering image of a target object at time i, wherein i is an integer greater than 0, and the actual scattering image is generated according to rays scattered by a body tissue where the target object is located;
   processing the actual scattering image or a reference image corresponding to the actual scattering image with a preset model, and determining a location offset of the target object at the time i according to the processing result, the preset model being indicative of a location conversion relationship of corresponding pixels in images that are formed before and after the rays are scattered; and
   tracking the target object according to the location offset of at least one time, the at least one time comprising the time i,
   wherein the preset model is a deconvolution model, and the processing the actual scattering image or a reference image corresponding to the actual scattering image with a preset model, and determining a location offset of the target object at the time i according to the processing result comprises:
      performing deconvolution processing on the actual scattering image by using the deconvolution model to acquire a target image; and
      comparing the target image with the reference image, and determining the location offset at the time i according to the comparison result; or
   wherein the preset model is a convolution model, and the processing the actual scattering image or a reference image corresponding to the actual scattering image with a preset model, and determining a location offset of the target object at the time i according to the processing result comprises:
      performing convolution processing on the reference image by using the convolution model to acquire a reference scattering image; and
      comparing the reference scattering image with the actual scattering image, and determining the location offset at the time i according to the comparison result.

2. The method according to claim 1, wherein 贴 the processing the actual scattering image or a reference image corresponding to the actual scattering image with a preset model, and determining a location offset of the target object at the time i according to the processing result comprises:

acquiring at least one scattering sample point of the actual scattering image and at least one reference sample point of the reference image; and performing convolution processing by using the convolution model according to the at least one reference sample point to convert the reference image into the target image comparable to the actual scattering image; or, performing deconvolution processing by using the deconvolution model according to the at least one scattering sample point to convert the actual scattering image into the reference scattering image comparable to the reference image.

3. The method according to claim 1, wherein the preset model is a probability model; and the method further comprises:

acquiring at least one scattering sample point of the actual scattering image and at least one reference sample point of the reference image; and calculating, according to the at least one scattering sample point and the at least one reference sample point, parameters in the probability model by using Monte Carlo simulation.

4. The method according to claim 1, wherein the acquiring an actual scattering image of a target object at time i comprises:

controlling the rays that are collimated to irradiate the body tissue where the target object is located at the time i; and generating the actual scattering image according to a signal converted from the rays scattered on the body tissue.

5. The method according to claim 4, wherein the generating the actual scattering image according to a signal converted from the rays scattered on the body tissue comprises:

controlling a detector to receive the rays scattered on the body tissue;

receiving the signal sent by the detector, the signal being converted from the rays scattered; and generating the actual scattering image according to the signal.

6. The method according to claim 5, wherein the scattered rays are directly received by the detector without beam collimation, or the scattered rays are received by the detector after beam being collimated lower than a preset beam collimation requirement.

7. The method according to claim 4, wherein the controlling collimated rays that are collimated to irradiate the body tissue where the target object is located at the time i comprises:

controlling a ray source to emit the rays through a first beam collimator to the body tissue where the target object is located at the time i.

8. The method according to claim 1, wherein the acquiring an actual scattering image of a target object at time i comprises:

generating the actual scattering image according to the rays cumulatively scattered by the body tissue where the target object is located between time i-1 and the time i.

9. An electronic device, comprising a processor and a memory, wherein the processor and the memory are in communication connection, and the memory stores a computer program; and the processor is configured to execute a tracking method, the tracking method comprising:

acquiring an actual scattering image of a target object at time i, wherein i is an integer greater than 0, and the actual scattering image is generated according to rays scattered by a body tissue where the target object is located;

processing the actual scattering image or a reference image corresponding to the actual scattering image with a preset model, and determining a location offset of the target object at the time i according to the processing result, the preset model being indicative of a location conversion relationship of corresponding pixels in images that are formed before and after the rays are scattered; and tracking the target object according to the location offset of at least one time, the at least one time comprising the time i, wherein the preset model is a deconvolution model, and the processing the actual scattering image or a reference image corresponding to the actual scattering image with a preset model, and determining a location offset of the target object at the time i according to the processing result comprises:

performing deconvolution processing on the actual scattering image by using the deconvolution model to acquire a target image; and comparing the target image with the reference image, and determining the location offset at the time i according to the comparison result; or wherein the preset model is a convolution model, and the processing the actual scattering image or a reference image corresponding to the actual scattering image with a preset model, and determining a location offset of the target object at the time i according to the processing result comprises:

performing convolution processing on the reference image by using the convolution model to acquire a reference scattering image; and comparing the reference scattering image with the actual scattering image, and determining the location offset at the time i according to the comparison result.

10. A tracking system, comprising a ray source, a detector and a processor, the detector being electrically connected with the processor, wherein:

the ray source is configured to emit rays to body tissue where a target object is located at time i, wherein i is an integer greater than 0;

the detector is configured to receive the rays scattered on the body tissue, convert the rays into a scattering image generation signal, and send the scattering image generation signal to the processor;

the processor is configured to generate an actual scattering image of the target object according to the scattering image generation signal sent by the detector; process the actual scattering image or a reference image corresponding to the actual scattering image by using a preset model, and determine a location offset of the target object at the time i according to the processing result, the preset model being indicative of a location conversion relationship of corresponding pixels in images that are formed before and after the rays are scattered; and track the target object according to the location offset of at least one time, the at least one time comprising the time i, and the ray source comprises a first ray source and a second ray source, and the detector comprises a first detection plate and a second detection plate, wherein:

the first detection plate is configured to receive the rays emitted by the second ray source and scattered on the body tissue, convert the rays into a first scattering image generation signal, and send the first scattering image generation signal to the processor, and correspondingly, the processor is configured to generate a first actual scattering image of the target object according to the first scattering image generation signal sent by the detector; and the second detection plate is configured to receive the rays emitted by the first ray source and scattered on the body tissue, convert the rays into a second scattering image generation signal, and send the second scattering image generation signal to the processor, and correspondingly, the processor is configured to generate a second actual scattering image of the target object according to the second scattering image generation signal sent by the detector.

11. The tracking system according to claim 10, wherein the detector is configured to, when moving to a position not right against the ray source, receive the rays scattered on the body tissue, convert the rays into the scattering image generation signal, and send the scattering image generation signal to the processor.

12. The tracking system according to claim 10, wherein:
the detector is further configured to, when moving to a position right against the ray source, receive direct rays passing through the body tissue, convert the rays into a direct image generation signal, and send the direct image generation signal to the processor; and
the processor is further configured to generate an actual direct image of the target object according to the direct image generation signal sent by the detector and perform image processing according to the actual direct image.

13. The tracking system according to claim 10, wherein the tracking system further comprises a first beam collimating device between the ray source and the target object, so that the rays emitted by the ray source are collimated by the first beam collimating device and cover the target object.

14. The tracking system according to claim 10, wherein the scattered rays are directly received by the detector without beam collimation, or the scattered rays are received by the detector after beam collimating lower than a preset beam collimation requirement.

15. The tracking system according to claim 14, wherein the tracking system further comprises a second beam collimating device between the target object and the detector such that the rays scattered on the body tissue are collimated to rays lower than a standard beam collimation requirement.

\* \* \* \* \*